United States Patent [19]
Nishimura et al.

[11] Patent Number: 4,669,680
[45] Date of Patent: Jun. 2, 1987

[54] WEBBING RETRACTOR

[75] Inventors: Yuji Nishimura; Shigeyasu Kanada, both of Niwa, Japan

[73] Assignee: Kabushiki Kaisha Tokai-Rika-Denki-Seisakusho, Aichi, Japan.

[21] Appl. No.: 782,449

[22] Filed: Oct. 1, 1985

[30] Foreign Application Priority Data

Oct. 3, 1984 [JP] Japan ............................ 59-150083[U]

[51] Int. Cl.⁴ .............................................. B60R 22/34
[52] U.S. Cl. .................................... 242/107; 280/807; 180/268
[58] Field of Search ......................... 242/107, 107.4 R; 280/803, 806, 807; 297/475; 180/268

[56] References Cited

U.S. PATENT DOCUMENTS

| 4,372,501 | 2/1983 | Inukai | 242/107 |
| 4,478,433 | 10/1984 | Taguchi et al. | 242/107 X |
| 4,489,804 | 12/1984 | Kamijo | 242/107 X |
| 4,511,097 | 4/1985 | Tsuge et al. | 280/807 X |
| 4,529,143 | 7/1985 | Kanada et al. | 242/107 |

FOREIGN PATENT DOCUMENTS

| 2526494 | 12/1976 | Fed. Rep. of Germany | 242/107.4 R |
| 77941 | 5/1984 | Japan | 280/807 |

Primary Examiner—John M. Jillions
Attorney, Agent, or Firm—Parkhurst & Oliff

[57] ABSTRACT

A webbing retractor has a take-up shaft for winding up a webbing. The take-up shaft is biased in the direction in which the webbing is wound up, by a spring having such a biasing force that there is no slack in the webbing when it is wound and yet the occupant feels no pressure from the webbing when he has the webbing fastened. When the webbing is unfastened and wound up onto the take-up shaft, a motor is activated, and the rotational force thereof is transmitted to the take-up shaft through a centrifugal clutch so that the take-up shaft is rotated, winding up the webbing.

22 Claims, 10 Drawing Figures

WEBBING RETRACTOR

BACKGROUND OF THE INVENTION

1. Field of the Invention:

The present invention relates to a webbing retractor for use in a seatbelt system designed to protect an occupant of a vehicle when an emergency situation occurs. More particularly, the present invention pertains to a webbing retractor which is arranged such as to protect the occupant from any discomfort caused by the pressure of the webbing of the seatbelt system.

2. Description of the Prior Art:

In seatbelt systems, a webbing is generally wound up onto a take-up shaft by means of the biasing force of a spiral spring.

Since the webbing needs to be fully wound up after the occupant releases the seatbelt, the spiral spring is required to have a relatively large biasing force.

Accordingly, it is necessary for the occupant to pull on the webbing with considerable force when unwinding the webbing in order to fasten it. In addition, the occupant may experience discomfort from the pressure of the webbing when he moves in the seat while driving with the webbing fastened.

In order to overcome the above-described disadvantages, one type of webbing retractor has previously been proposed in which the outer end of a spiral spring is turned by employing a motor so that the webbing wind-up force can be adjusted (see, e.g., Japanese Utility Model Application No. 75129/1983).

However, this webbing retractor, in which the webbing wind-up force is made adjustable by the use of a motor, needs a webbing tension detector in order to adjust the webbing tension in accordance with the condition of the webbing, which changes depending on whether, for example, the occupant has the webbing fastened or not. In consequence, the structure and control of this type of conventional webbing retractor are overly complicated.

SUMMARY OF THE INVENTION

In view of the above-described circumstances, it is a primary object of the present invention to provide a webbing retractor which is capable of preventing the occupant from feeling any discomfort caused by the pressure of the webbing, without complicating the structure and control thereof.

To this end, the present invention provides a webbing retractor in which a webbing take-up means is biased in the direction in which the webbing is wound by a relatively small force from a biasing means, for example, a spiral spring, and when the webbing is wound up, the rotational force of a driving means is transmitted to the webbing take-up means through a transmission means.

According to another aspect of the present invention, a webbing retractor is provided which has a biasing means for biasing, with a relatively small force, a take-up means for winding up a webbing in the direction in which it is wound, an engagement detecting means for detecting whether or not a tongue plate attached to the webbing is in engagement with a buckle device, and a means of detecting whether or not the webbing has been fully wound up onto the take-up means. In this apparatus, a control means is employed to effect control such that a driving means is activated until the webbing is fully wound on the take-up means after the tongue plate and the buckle device are disengaged from each other, whereby the driving force of the driving means is transmitted to the takeup means through a transmission means so as to wind up the webbing.

According to still another aspect of the present invention, the above-described webbing retractor with the control means is further provided with a lock detecting means for detecting whether or not the driving means has been stopped by an external force, so that when the driving means is suspended by an external force, the supply of electric power to the driving means is cut off.

In operation, the transmission means is disengaged when the occupant has the webbing fastened.

Accordingly, there is no risk of drag torque from the driving means (e.g., torque caused by the driving means rotating when it should be OFF) being transmitted to the webbing take-up means. In addition, the force applied to the webbing take-up means by the biasing means so as to wind up the webbing is so small that the occupant feels no pressure from the webbing when he has the webbing fastened. However, the webbing is tensed sufficiently that there is no slack.

When the occupant unfastens the webbing and it is wound up onto the webbing take-up means, the transmission means is engaged, and the rotational force of the driving means is thereby transmitted to the webbing take-up means.

Accordingly, it is possible for the webbing to be fully wound up even when the webbing wind-up force applied by the biasing means alone is relatively small.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
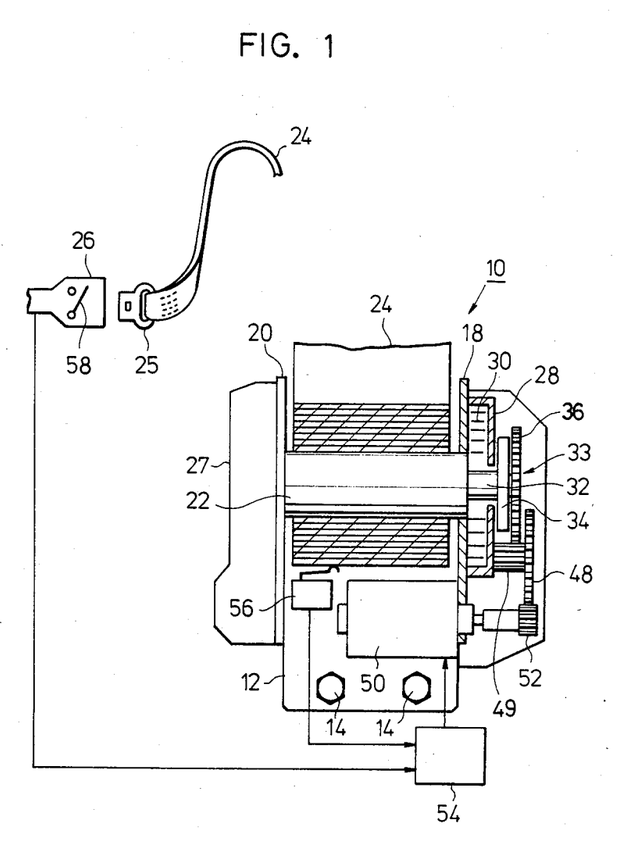
FIG. 1 is a partly-sectioned front elevational view of a first embodiment of the webbing retractor according to the present invention.

FIG. 1 shows a webbing retractor 10 in accordance with a first embodiment of the present invention. In this webbing retractor 10, a frame 12 is secured to the vehicle body by means of mounting bolts 14.

A pair of parallel leg plates 18 and 20 extend from both sides of the frame 12, respectively. Both end portions of a take-up shaft 22 are rotatably supported by the leg plates 18 and 20, respectively. One end of an occupant restraining webbing 24 is retained at the central portion of the take-up shaft 22, and the webbing 24 is wound in layers on the shaft 22.

A tongue plate 25 is attached to the other end of the webbing 24. The tongue plate 25 is engageable with a buckle device 26 which is secured to another portion of the vehicle body. The intermediate portion of the webbing 24 is employed to fasten the body of the occupant.

An inertia type lock mechanism 27 is mounted outside the leg plate 20 and is interposed between the take-up shaft 22 and the leg plate 20. This inertia type lock mechansim 27 has a structure which is generally employed. More specifically, the mechanism 27 is arranged such as to abruptly stop the rotation of the take-up shaft 22 in the direction in which the webbing 24 is wound off at the time of a vehicular emergency by detecting the acceleration of the vehicle body or the acceleration of the webbing 24 when it is wound off.

Figure 2:
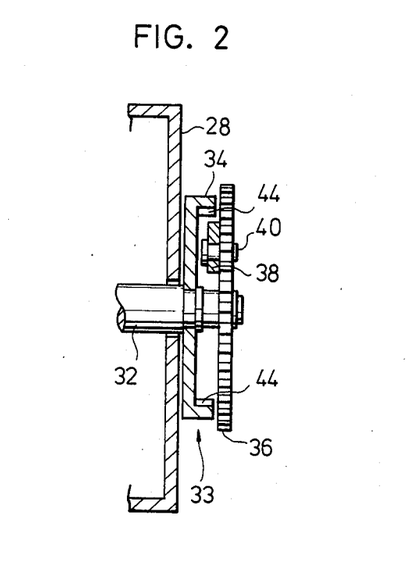
FIGS. 2 and 3 are fragmentary enlarged views showing the structure of the centrifugal clutch shown in FIG. 1.
Figure 3:
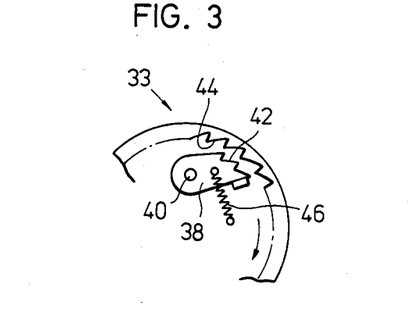

A spring casing 28 is secured to the leg plate 18, and the outer end of a spiral spring 30 is retained by the inner peripheral surface of the spring casing 28. The inner end of the spiral spring 30 is retained by a driven shaft 32 which is constituted by the end portion of the take-up shaft 22 extending through the leg plate 18. The driven shaft 32 further extends through the spring casing 28. As shown in FIG. 2, a centrifugal clutch 33 is mounted on this projecting end of the driven shaft 32. An internally-toothed ratchet wheel 34 which constitutes a part of the centrifugal clutch 33 is fitted on the driven shaft 32 so as to rotate together with the take-up shaft 22 in one unit. A spur gear 36 is rotatably supported at the distal end of the driven shaft 32. As also shown in FIG. 3, a lock member 38 is pivotally supported through a pin 40 on the end face of the spur gear 36 on the side thereof which is closer to the ratchet wheel 34. Lock teeth 42 are formed at the distal end portion of the lock member 38 so that when the lock member 38 pivots about the pin 40 counterclockwise as viewed in FIG. 3, the lock teeth 42 engage with the ratchet teeth 44 formed on the ratchet wheel 34, thus bringing the centrifugal clutch 33 into an engaged state. The intermediate portion of the lock member 38 is connected to the end face of the spur gear 36 by a coil spring 46. Accordingly, the lock teeth 42 are normally separated from the ratchet teeth 44 by the biasing force of the spring 46; hence, the centrifugal clutch 33 is in a disengaged state.

As shown in FIG. 1, a reduction spur gear 48 is rotatably supported on the outer end face of the spring casing 28, and a gear 49 is concentrically secured to the spur gear 48, the gear 49 being meshed with the spur gear 38. The reduction spur gear 48 is meshed with a spur gear 52 secured to the rotary shaft of a motor 50 which is secured to the frame 12.

The motor 50 is controlled by a control circuit 54. The control circuit 54 is supplied with, as inputs, signals respectively delivered from a webbing switch 56 and a buckle switch 58, the switch 56 detecting whether or not the webbing 24 has been fully wound up onto the take-up shaft 22. The webbing switch 56 is constituted by a microswitch which is mounted on the frame 12. The switch 56 turns ON when the webbing 24 has been fully wound up onto the take-up shaft 22, that is, when the diameter of the roll of webbing wound up onto the take-up shaft 22 reaches the maximum. The buckle switch 58 is incorporated in the buckle device 26. The switch 58 turns ON when the tongue plate 25 is inserted into the buckle device 26 so as to be enagaged with the latter.

Figure 5:
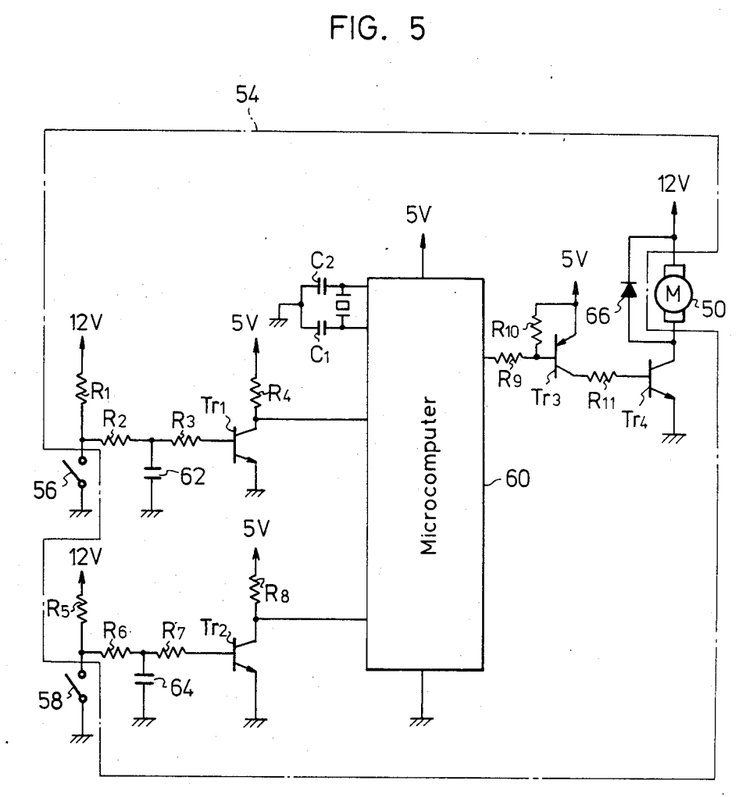
FIG. 5 is a diagram of a control circuit in accordance with the first embodiment.

The control circuit 54 is, as shown in FIG. 5, constituted by a microcomputer 60 as its main element. Capacitors 62 and 64 are employed to eliminate possible chattering, while a diode 66 is employed as a surge killer. In FIG. 5, $R_1$ to $R_{11}$ denote resistors, $Tr_1$ to $Tr_4$ transistors, and $C_1$ and $C_2$ capacitors.

Figure 6:
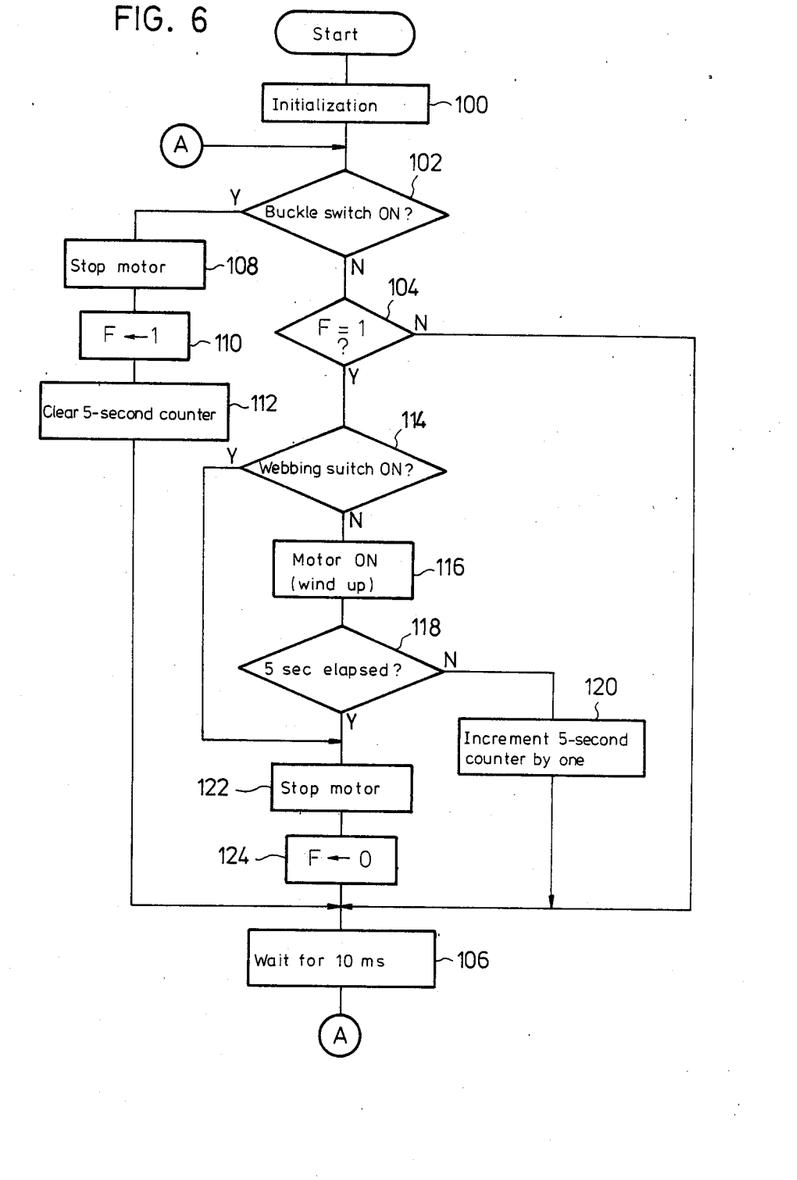
FIG. 6 is a flow chart of the control flow.

The operation of the first embodiment arranged as above will now be described with reference to the time chart shown in FIG. 4 and the flow chart shown in FIG. 6. This flow chart corresponds to the program stored in the microcomputer 60.

The control process carried out before the webbing 24 is fastened to the occupant will first be described.

When the power supply of the control circuit 54 is turned ON, the work area in the microcomputer 60 is initialized (Step 100), and a flag F and a 5-second counter C are cleared. In this state, the buckle switch 58 is OFF (Step 102), and F=0 (Step 104). Therefore, after waiting for 10 msec, the control process returns to Step 102.

The control process carried out from the time when the occupant unwinds the webbing 24 to the time when he fastens the webbing 24 on his body will next be described.

Figure 4:
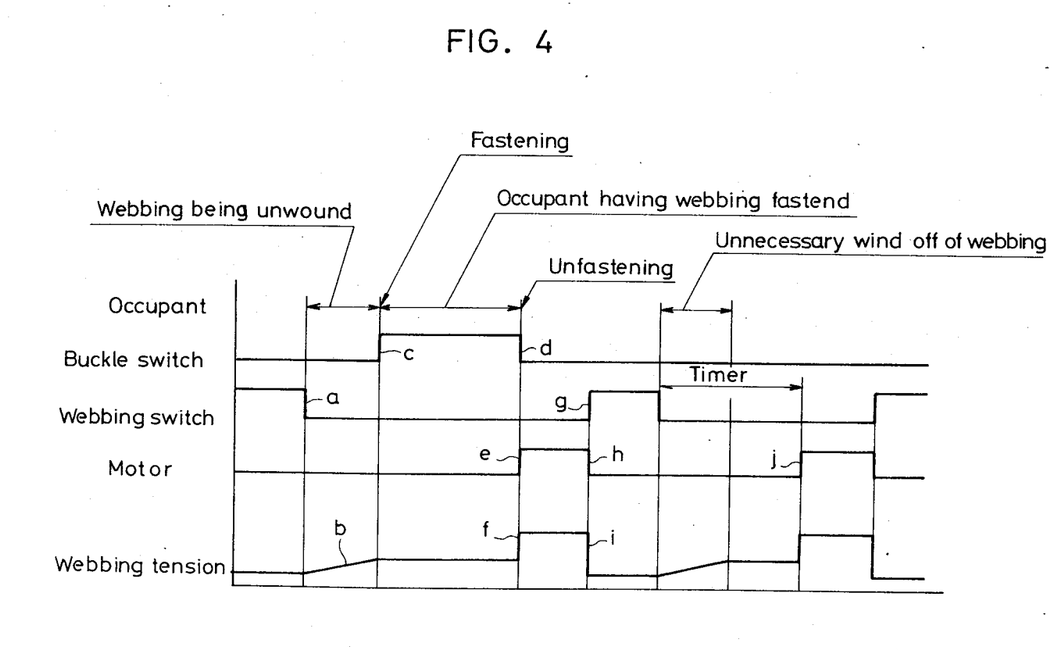
FIG. 4 is a time chart of a control flow in accordance with the first embodiment.

When a small length of the webbing 24 is unwound, the webbing switch 56 turns OFF (see a in FIG. 4). However, the buckle switch 58 remains OFF in this case. Therefore, the processing of Steps 102 to 106 is repeated in a manner similar to the above.

As the webbing 24 is unwound, the webbing wind-up force of the spiral spring 30 gradually increases (see b in FIG. 4). However, since the biasing force of the spring 30 is relatively small, it is possible for the occupant to unwind the webbing 24 with ease. In this case, the motor 50 is OFF, and the centrifugal clutch 33 is in a disengaged state. There is therefore no risk of drag torque of the motor 50 being transmitted to the take-up shaft 22.

When the tongue plate 25 is engaged with the buckle device 26, the buckle switch 58 turns ON (see c in FIG. 4). In consequence, the control process shifts from Step 102 to Step 108, in which the motor 50 is turned OFF. In this case, however, the motor 50 is OFF from the first; therefore, no change takes place for the motor 50. Next, the flag F is set (Step 110), and the 5-second counter C is cleared (Step 112). Then, after waiting for 10 msec (Step 106), the process returns to Step 102.

When the occupant has the webbing fastened, the processing of Steps 102, 108 to 112, and 106 is repeated. Since the biasing force of the spiral spring 30 is relatively small, there is no risk of the occupant feeling any pressure from the webbing 24. However, the webbing 24 is tensed sufficiently that there is no slack.

Accordingly, there is no need to control the webbing tension and to consume unnecessary electric power. In addition, no abnormal sound or noise is produced.

The following is a description of the control process carried out when the occupant unfastens the webbing 24.

When the tongue plate 25 is disengaged from the buckle device 26, the buckle switch 58 turns OFF. In consequence, the process shifts from Step 102 to Step 104. Since F=1 in Step 110, the process proceeds to Step 114. Since the webbing 24 has been unwound and consequently the webbing switch 56 is OFF, the motor 50 is turned ON (Step 116).

As the motor 50 is turned ON, the spur gear 38 is rotated clockwise as viewed in FIG. 3 through the spur gears 52, 48 and the gear 49. As a result, centrifugal force acts on the lock member 38 so that the lock teeth 42 engage with the ratchet teeth 44 against the biasing force of the coil spring 46, thus bringing the centrifugal clutch 33 into an engaged state. In consequence, the internally-toothed ratchet wheel 34 rotates together with the spur gear 36 in one unit, causing the take-up shaft 22 to rotate in the direction in which the webbing 24 is wound. Therefore, even if the biasing force of the spiral spring 30 is relatively small, it is possible for the webbing 24 to be fully wound up by the additional force provided by the torque derived from the motor 50 (see f in FIG. 4).

When the count of the 5-second counter C is less than 500, that is, within 10 msec×500=5 sec (Step 118), the count of the counter C is incremented (Step 120), and after waiting for 10 msec (Step 106), the process returns to Step 102. When the count of the counter C is less than 500 and the webbing switch 56 is OFF, the processing of the above Steps 102, 104, 114 to 120, and 106 is repeated.

Normally, the webbing 24 has been fully wound up onto the take-up shaft 22 within five seconds, and the webbing switch 56 turns ON (see f in FIG. 4). In consequence, the process shifts from Step 114 to Step 122, in which the motor is stopped (see h in FIG. 4), and the flag F is reset (Step 124). Then, after waiting for 10 msec (Step 106), the process returns to Step 102. Thus, the webbing tension is also decreased (see i in FIG. 4).

When the webbing switch 56 remains OFF after five seconds has elapsed, the process shifts from Step 118 to Step 122, in which the motor 50 is stopped similarly to the above (Step 122). After processing Steps 124 and 106, the control process returns to Step 102. Accordingly, there is no risk of the motor 50 being overloaded for a long period of time.

In the case where immediately after the tongue plate 25 has been disengaged from the buckle device 26, the former is reengaged with the latter, the process shifts from Step 102 to Step 108, in which the motor 50 is stopped immediately. A second embodiment of the present invention will now be described.

This embodiment is arranged such that if the tongue plate 25 or the webbing 24 is interfered with and caught by any obstruction when the webbing 24 is being wound up, this is detected, and measures to cope with the trouble are taken.

Figure 7:
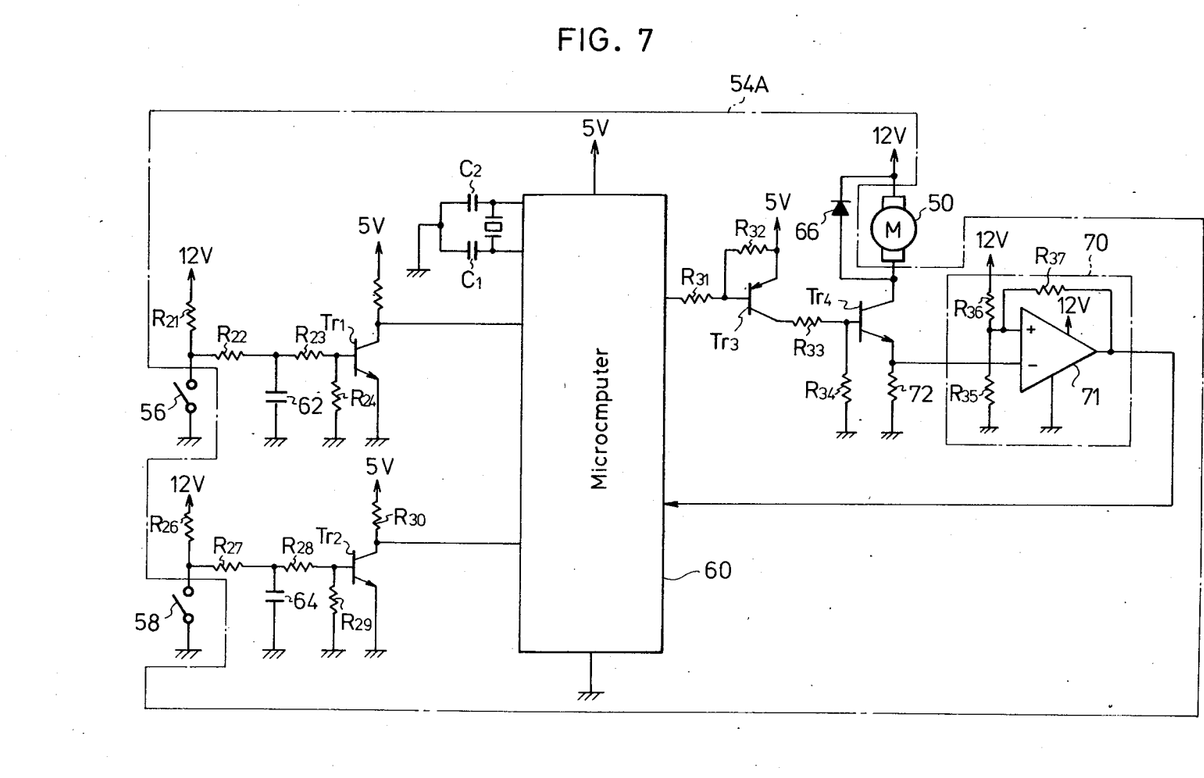
FIG. 7 is a diagram of a control circuit in accordance with a second embodiment of the present invention.

More specifically, a control circuit 54A in this embodiment is constituted by a combination of the above-described control circuit 54 and a motor lock detecting circuit 70 provided additionally, as shown in FIG. 7. The motor lock detecting circuit 70 has a comparator 71 which makes comparison between a reference voltage $E_0$ and a voltage E generated across a resistor 72 by the current flowing through the motor 50. When $E > E_0$, the comparator 71 outputs an ON signal to the microcomputer 60. The motor lock detecting circuit 70 is arranged such that when the motor 50 is ON, that is, rotating, the condition of $E < E_0$ holds; when the motor 50 is locked and hence ceases rotating, the impedance of the motor 50 decreases, and the current flowing through the motor 50 increases, so that the condition of $E > E_0$ holds. In FIG. 7, $R_{21}$ to $R_{37}$ denote resistors, $Tr_1$ to $Tr_4$ transistors, $C_1$ and $C_2$ capacitors, and 62 and 64 capacitors similar to the above.

Figure 8A:
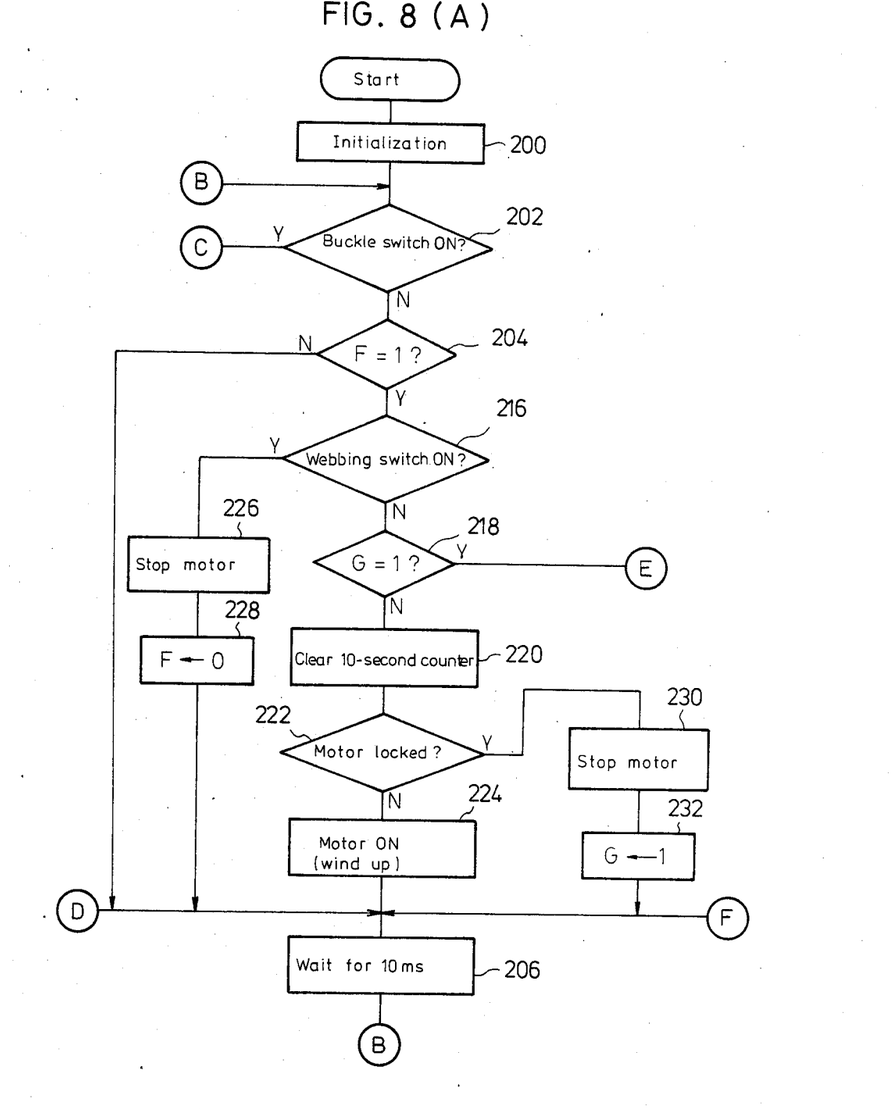
FIGS. 8(A), 8(B) and 8(C) is a flow chart of a control flow in accordance with the second embodiment.
Figure 8B:
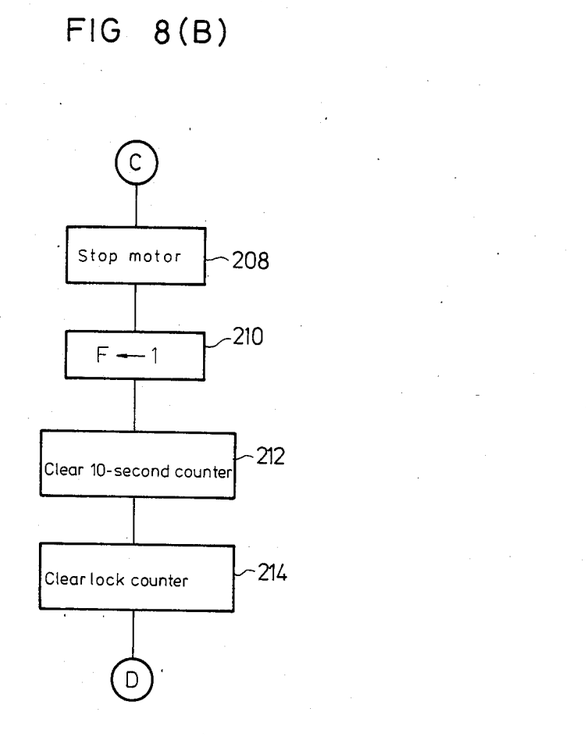
Figure 8C:
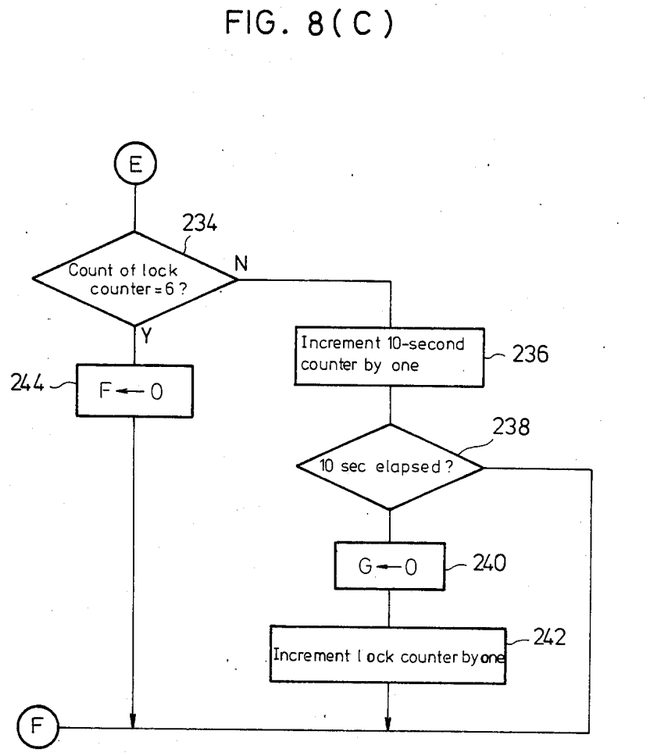

The following is a description of the control flow executed by the microcomputer 60 with reference to the flow chart shown in FIG. 8.

The control process carried out before the occupant fastens the webbing 24 will first be described.

When the power supply of the control circuit 54A is turned ON, the work area in the microcomputer 60 is initialized (Step 200), and flags F and G, a 10-second counter C and a lock counter R, described later, are cleared. At the beginning, the buckle switch 58 is OFF (Step 202), and F=0 (Step 204). Therefore, after waiting for 10 msec (Step 206), the control process returns to Step 202.

The control process carried out from the time when the occupant unwinds the webbing 24 to the time when he fastens the webbing 24 will next be described.

Until the occupant is fastened by the webbing 24, the above-described processing is repeated. When the occupant fastens the webbing 24, the buckle switch 58 turns ON. In consequence, the process shifts from Step 202 to Step 208, in which the motor 50 is stopped. Since the motor 50 is OFF from the start, there is no change in the motor 50. Then, the flag F is set (F=1) (Step 210), the 10-second counter C is cleared (C=0) (Step 212), and the lock counter R is cleared (R=0) (Step 214). Then, after waiting for 10 msec (Step 206), the process returns to Step 202.

When the occupant has the webbing fastened, the processing of the above Steps 202, 208 to 214, and 206 is repeated.

The following is a description of the control process carried out when the occupant unfastens the webbing 24.

When the tongue plate 25 is disengaged from the buckle device 26, the buckle switch 58 turns OFF. In consequence, the process shifts from Step 202 to Step 204. Since the flag F has been set (F=1) in Step 210, the process proceeds to Step 216. In this case, the webbing 24 has been unwound and consequently the webbing switch 56 is OFF (Step 216), and the flag G has been reset (G=0) in Step 200 (Step 218). Therefore, the 10-second counter C is cleared (Step 220). Since the motor 50 is OFF and is not locked (Step 222), the motor 50 is turned ON so as to wind up the webbing 24 (Step 224). Then, after waiting for 10 msec (Step 206), the process returns to Step 202.

Normally, the webbing 24 is fully wound up onto the take-up shaft 22 without any locking (stopping) of the motor 50, and consequently the webbing switch 56 turns ON. Accordingly, the process shifts from Step 216 to Step 226, in which the motor 50 is stopped. Then, the flag F is reset (F=0) (Step 228), and after waiting for 10 msec (Step 206), the process returns to Step 202. Then, the processing of Steps 202 to 206 is repeated.

When the motor 50 is locked while the webbing 24 is being wound up, the process shifts from Step 222 to Step 230, in which the motor 50 is temporarily stopped. Then, the flag G is set (G=1) (Step 232), and after waiting for 10 msec (Step 206), the process returns to Step 202. After processing Steps 202, 204 and 216, the control process proceeds to Step 234 because G=1 in Step 218. Since the lock counter R has been cleared in Step 200 (Step 234), the 10-second counter C is incremented (Step 236). When C<1,000, that is, within 10 msec×1,000=10 sec (Step 238), after waiting for 10 msec (Step 206), the process returns to Step 202. Then, the above processing is repeated. When ten seconds has elapsed in Step 238, the process proceeds to Step 240, in which the flag G is reset (G=0). Then, the lock counter R is incremented (Step 242), and after waiting for 10 msec (Step 206), the process returns to Step 202. Since the flag G has been reset (G=0) in Step 240, the processing of Steps 202, 204 and 216 to 222 is executed.

Since the motor 50 is at rest, the motor 50 is judged not to be locked in Step 222, and the motor 50 is turned ON (Step 224). When the motor 50 is judged to be locked in Step 222, the motor is stopped (Step 230). When the webbing 24 cannot be fully wound up, the above processing is repeated up to six times. When the count of the lock counter R is six, the process shifts from Step 234 to Step 244, in which the flag F is reset (F=0), and after waiting for 10 msec (Step 206), the process returns to Step 202. Then, the processing of Steps 202 to 206 is repeated.

When the motor 50 is locked, the occupant normally becomes aware of this and removes the cause of the locking within 60 seconds, thereby allowing the webbing 24 to be wound up fully.

It is to be noted that the arrangement may be such that, as shown in FIG. 4, a timer is started when the webbing 24 begins to be unwound, and if the buckle switch 58 does not turn ON within a predetermined period of time (e.g., ten seconds), the motor 50 is turned ON (see j FIG. 4) so as to wind up the webbing 24.

Further, the motor 50 may be reversed for a very short period of time immediately after it has been turned OFF so that the lock teeth 42 are reliably disengaged from the ratchet teeth 44. This reverse rotation of the motor 50 does not cause the take-up shaft 22 to rotate in reverse.

Furthermore, the centrifugal clutch 33 employed in the present invention is not necessarily limitative, and other types of clutch, for example, electromagnetic clutches, may be employed.

In the webbing retractor according to the present invention, a webbing take-up means is biased in the direction in which the webbing is wound up, by a relatively small force of a biasing means sufficiently that there is no slack in the webbing. It is therefore possible for the occupant to unwind and fasten the webbing with ease. In addition, there is no risk of the occupant feeling any pressure from the webbing when he has the webbing fastened. Since there is no need to provide a webbing tension detector in order to control the webbing tension, the structure of the webbing retractor is greatly simplified.

Since the rotational force of a driving means is transmitted to the webbing take-up means through a transmission means, there is no risk of drag torque from the driving means being transmitted to the webbing take-up means when the occupant has the webbing fastened, which would otherwise increase the webbing tension undesirably. In addition, it suffices to operate the driving means only when the occupant fastens and unfastens the webbing. Accordingly, the control is simple, and power consumption is small.

What is claimed is:

1. A webbing retractor comprising:
    take-up means for winding up a webbing, said webbing having one end thereof secured to said take-up means;
    biasing means for biasing, with a relatively small biasing force, said take-up means in the direction in which said webbing is wound up;
    engagement detecting means for detecting whether or not a tongue plate attached to the other end of said webbing is engaged with a buckle device;
    driving means for rotating said take-up means in the direction in which said webbing is wound up;
    webbing detecting means for detecting whether or not said webbing has been fully wound up onto said take-up means;
    control means for normally activating said driving means from the time when said engagement detecting means detects the disengagement between said tongue plate and said buckle device to the time when said webbing detecting means detects that said webbing has been fully wound up onto said take-up means, and for deactivating said driving means when a predetermined period of time has elapsed after said engagement detecting means has detected the disengagement between said tongue plate and said buckle device, even when said webbing detecting means has not yet detected that said webbing has been fully wound up onto said take-up means; and
    transmission means for transmitting the driving force of said driving means to said take-up means when said driving means is activated, thereby rotating said take-up means in the direction in which said webbing is wound up.

2. A webbing retractor according to claim 1, wherein said transmission means is a clutch which connects together said take-up means and said driving means when said driving means is activated.

3. A webbing retractor according to claim 1, wherein said transmission means is a centrifugal clutch which connects together said take-up means and said driving means by means of centrifugal force.

4. A webbing retractor according to claim 2, wherein the biasing force of said biasing means is set to such a magnitude that when the occupant has the webbing fastened, there is no slack in said webbing when it is wound, and yet the occupant feels no pressure from said webbing when he has said webbing fastened.

5. A webbing retractor according to claim 3, wherein the biasing force of said biasing means is set to such a magnitude that when the occupant has the webbing fastened, there is no slack in said webbing when it is wound, and yet the occupant feels no pressure from said webbing when he has said webbing fastened.

6. A webbing retractor according to claim 3, wherein said centrifugal clutch includes:
    an internally-toothed ratchet wheel secured to said take-up means and having an internally-toothed ratchet;
    a spur gear rotatably mounted on said take-up means so as to be rotated by said driving means; and
    a lock member having a lock tooth engageable with said internally-toothed ratchet, said lock member being pivotally mounted on one side surface of said spur gear and constantly biased in the direction in which said lock tooth is separated from said internally-toothed ratchet.

7. A webbing retractor according to claim 5, wherein said
    centrifugal clutch includes:
    pl an internally-toothed ratchet wheel secured to said take-up means and having an internally-toothed ratchet;
    a spur gerar rotatably mounted on said take-up means so as to be rotated by said driving means; and
    a lock member having a lock tooth engageable with said internally-toothed ratchet, said lock member being pivotally mounted on said side surface of said spur gear and constantly biased in the direction in which said lock tooth is separated form said internally-toothed ratchet.

8. A webbing retractor according to claim 1, wherein the biasing force of said biasing means is set to such a magnitude that when the occupant has the webbing fastened, there is no slack in said webbing when it is wound, and yet the occupant feels no pressure from said webbing when he has said webbing fastened.

9. A webbing retractor according to claim 1, wherein said transmission means is a centrifugal clutch which includes:
   an internally-toothed ratchet wheel secured to said take-up means and having an internally-toothed ratchet;
   a spur gear rotatably mounted on said take-up means so as to be rotated by said driving means; and
   a lock member having a lock tooth engageable with said internally-toothed ratchet, said lock member being pivotally mounted on one side surface of said spur gear and constantly biased in the direction in which said lock tooth is separated from said internally-toothed ratchet.

10. A webbing retractor according to claim 8, wherein said transmission means is a centrifugal clutch which includes:
    an internally-toothed ratchet wheel secured to said take-up means and having an internally-toothed ratchet;
    a spur gear rotatably mounted on said take-up means so as to be rotated by said driving means; and
    a lock member having a lock tooth engageable with said internally-toothed ratchet, said lock member being pivotally mounted on one side surface of said spur gear and constantly biased in the direction in which said lock tooth is separated from said internally-toothed ratchet.

11. A webbing retractor comprising:
    take-up means for winding up a webbing having one end thereof secured to said take-up means;
    biasing means for biasing, with a relatively small biasing force, said take-up means in the direction in which said webbing is wound up;
    engagement detecting means for detecting whether or not a tongue plate attached to the other end of said webbing is engaged with a buckle device;
    driving means for rotating said take-up means in the direction in which said webbing is wound up;
    webbing detecting means for detecting as to whether or not said webbing has maximumly been wound up onto said take-up means;
    lock detecting means for detecting as to whether or not said driving means is stopped by an external force while said driving means is being supplied with electric power;
    control means for effecting control such that said driving means is supplied with electric power from the time when said engagement detecting means detects the disengagement between said tongue plate and said buckle device to the time when said webbing detecting means detects the fact that said webbing has been fully wound up onto said take-up means, and such that the supply of electric power to said driving means is stopped when said lock detecting means detects a stop of said driving means while it is being supplied with electric power; and
    transmission means for transmitting the driving force of said driving means to said take-up means when said driving means is activated by means of electric power supplied thereto, thereby rotating said take-up means in the direction in which said webbing is wound up.

12. A webbing retractor according to claim 11, wherein said control means supplies said driving means with electric power from the time when said engagement detecting means detects disengagement between said tongue plate and said buckle device to the time when said webbing detecting means detects the fact that said webbing has been fully wound up onto said take-up means, stops the supply of electric power to said driving means when said lock detecting means detects a stop of said driving means while it is being supplied with electric power, and resumes the supply of electric power when a predetermined period of time has elapsed after stopping the supply of electric power, the stop and resumption of supply of electric power being repeated as required.

13. A webbing retractor according to claim 12, wherein said control means continuously stops the supply of electric power to said driving means as long as said lock detecting means detects the stop of said driving means after said stop and resumption of the supply of electric power have been repeated a predetermined number of times.

14. A webbing retractor according to claim 11, wherein the biasing force of said biasing means is set to such a magnitude that when the occupant has the webbing fastened, there is no slack in said webbing when it is wound, and yet the occupant feels no pressure from said webbing when he has said webbing fastened.

15. A webbing retractor according to claim 12, wherein the biasing force of said biasing means is set to such a magnitude that when the occupant has the webbing fastened, there is no slack in said webbing when it is wound, and yet the occupant feels no pressure from said webbing when he has said webbing fastened.

16. A webbing retractor according to claim 13, wherein the biasing force of said biasing means is set to such a magnitude that when the occupant has the webbing fastened, there is no slack in said webbing when it is wound, and yet the occupant feels no pressure from said webbing when he has said webbing fastened.

17. A webbing retractor according to claim 11, wherein said transmission means is a centrifugal clutch which includes:
    an internally-toothed ratchet wheel secured to said take-up means and having an internally-toothed ratchet;
    a spur gear rotatably mounted on said take-up means so as to be rotated by said driving means; and
    a lock member having a lock tooth engageable with said internally-toothed ratchet, said lock member being pivotally mounted on one side surface of said spur gear and constantly biased in the direction in which said lock tooth is separated from said internally-toothed ratchet.

18. A webbing retractor according to claim 12, wherein said transmission means is a centrifugal clutch which includes:
    an internally-toothed ratchet wheel secured to said take-up means and having an internally-toothed ratchet;
    a spur gear rotatably mounted on said take-up means so as to be rotated by said driving means; and
    a lock member having a lock tooth engageable with said internally-toothed ratchet, said lock member being pivotally mounted on one side surface of said spur gear and constantly biased in the direction in which said lock tooth is separated from said internally-toothed ratchet.

19. A webbing retractor according to claim 13, wherein said transmission means is a centrifugal clutch which includes:
an internally-toothed ratchet wheel secured to said take-up means and having an internally-toothed ratchet;
a spur gear rotatably mounted on said take-up means so as to be rotated by said driving means; and
a lock member having a lock tooth engageable with said internally-toothed ratchet, said lock member being pivotally mounted on one side surface of said spur gear and constantly biased in the direction in which said lock tooth is separated from said internally-toothed ratchet.

20. A webbing retractor according to claim 14, wherein said transmission means is a centrifugal clutch which includes:
an internally-toothed ratchet wheel secured to said take-up means and having an internally-toothed ratchet;
a spur gear rotatably mounted on said take-up means so as to be rotated by said driving means; and
a lock member having a lock tooth engageable with said internally-toothed ratchet, said lock member being pivotally mounted on one side surface of said spur gear and constantly biased in the direction in which said lock tooth is separated from said internally-toothed ratchet.

21. A webbing retractor according to claim 15, wherein said transmission means is a centrifugal clutch which includes:
an internally-toothed ratchet wheel secured to said take-up means and having an internally-toothed ratchet;
a spur gear rotatably mounted on said take-up means so as to be rotated by said driving means; and
a lock member having a lock tooth engageable with said internally-toothed ratchet, said lock member being pivotally mounted on one side surface of said spur gear and constantly biased in the direction in which said lock tooth is separated from said internally-toothed ratchet.

22. A webbing retractor according to claim 16, wherein said transmission means is a centrifugal clutch which includes:
an internally-toothed ratchet wheel secured to said take-up means and having an internally-toothed ratchet;
a spur gear rotatably mounted on said take-up means so as to be rotated by said driving means; and
a lock member having a lock tooth engageable with said internally-toothed ratchet, said lock member being pivotally mounted on one side surface of said spur gear and constantly biased in the direction in which said lock tooth is separated from said internally-toothed ratchet.

* * * * *